Feb. 5, 1935.  F. L. ORR  1,990,345
VARIABLE SPEED TRANSMISSION
Filed May 27, 1933   2 Sheets-Sheet 1
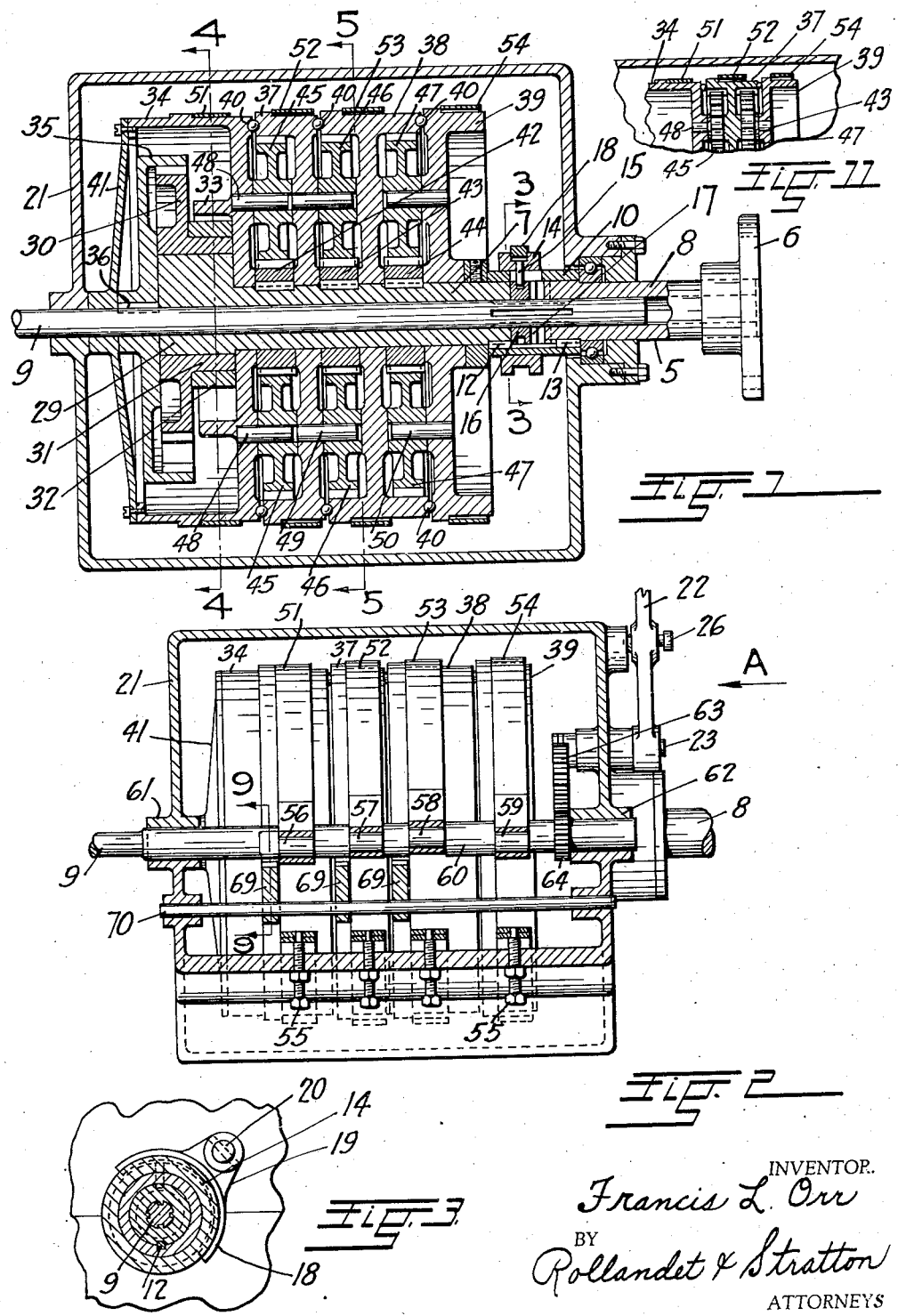
INVENTOR.
Francis L. Orr
BY
Rollandet & Stratton
ATTORNEYS

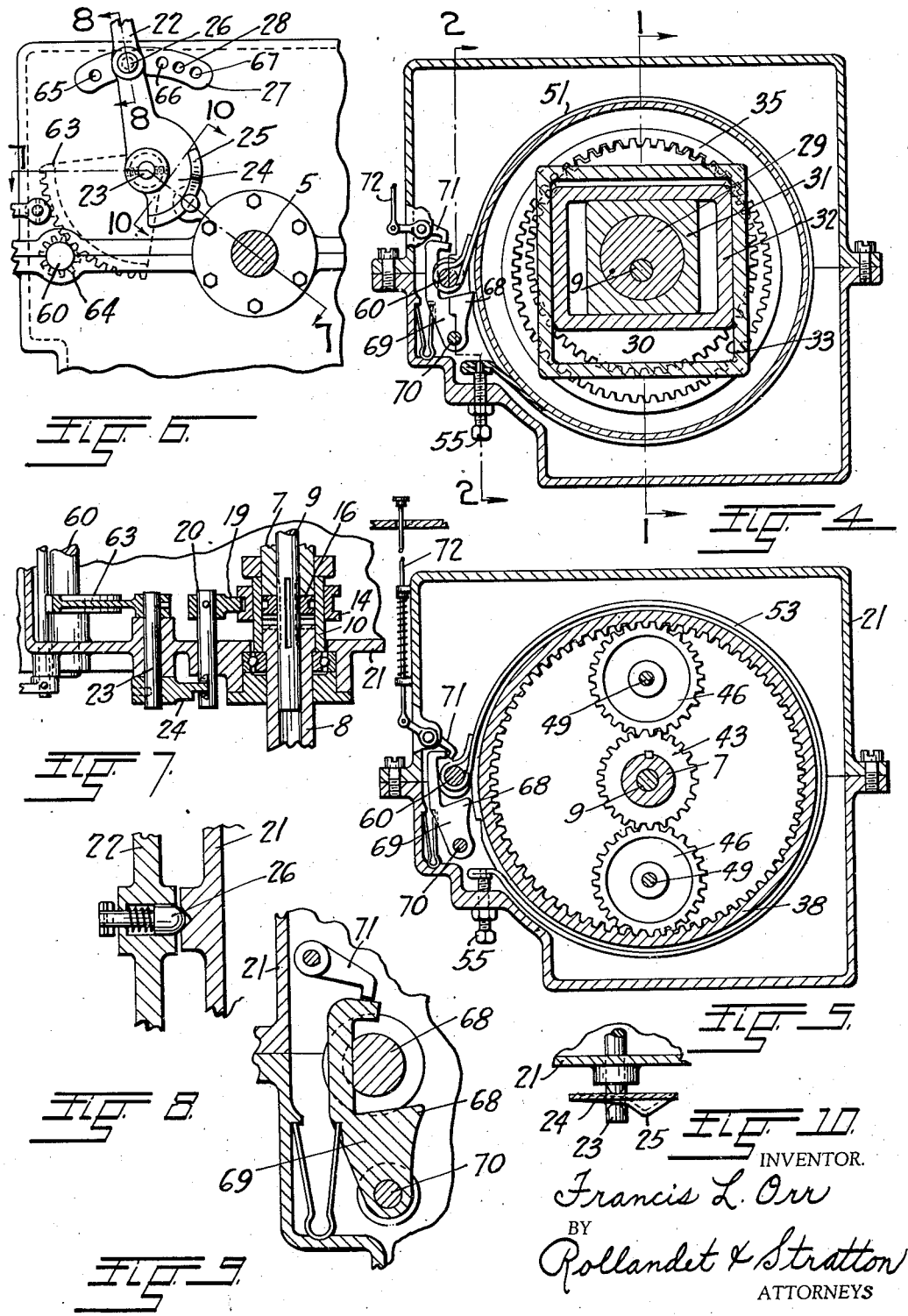

Patented Feb. 5, 1935

1,990,345

UNITED STATES PATENT OFFICE 1,990,345

VARIABLE SPEED TRANSMISSION

Francis L. Orr, Denver, Colo., assignor of one-half to Claude H. Long, Denver, Colo., and one-fourth to Anthony E. Heichemer Application May 27, 1933, Serial No. 673,210

13 Claims. (Cl. 74—283)

This invention relates to power transmitting mechanism, its primary object being to provide a gearing of novel construction by which the mechanical energy developed in a prime mover may be transmitted to a driven element at any one of a number of speeds and in either of two directions of rotation. The invention is particularly adapted for use in motor driven vehicles to transmit the movement of the motor shaft to the differential or other rotary driven element, under the control of the driver of the vehicle, and it includes in its construction, a transmission gearing disclosed in my United States Letters Patent No. 1,571,457, issued on the 2nd day of February, 1926.

Other objects of the invention, additional to the general objects stated hereinbefore, consist in details of construction and in novel arrangements and combinations of parts, as will be clearly brought out in the course of the following description.

An embodiment of the invention has been illustrated in the accompanying drawings, in the several views of which like parts are similarly designated, and in which Figure 1 is a sectional elevation of my transmission mechanism taken in a plane indicated by the line 1—1 of Figure 4, Figure 2 is a sectional elevation taken on the line 2—2 of Figure 4, Figure 3 is a section along the line 3—3 of Figure 1, Figure 4 is a section along the line 4—4 of Figure 1, Figure 5 is a section taken on the line 5—5 of Figure 1, Figure 6 is a fragmentary elevation looking in the direction of the arrow A in Figure 2, Figure 7 is a broken section along the line 7—7 of Figure 6, Figure 8 is an enlarged section on the line 8—8 of Figure 6, Figure 9 is an enlarged section on the line 9—9 of Figure 2, Figure 10 is a section taken on the line 10—10 of Figure 6, and Figure 11 is a sectional view showing a modified arrangement of the drums included in the invention.

A hollow shaft 5 of the transmission mechanism is an extension of the shaft of the engine to which the mechanism is applied, the flanged collar 6 being a member of a coupling by which the two shafts are connected. The engine shaft has not been shown in the drawings.

The shaft 5 is made in two sections 7 and 8 for the purpose of providing a space for the application of a clutch to the shaft 9 of a differential or other driven element, which extends inside the hollow shaft. The two sections of the shaft 5 are permanently connected by a slotted sleeve 10 which is keyed to the sections, as at 12 and 13, and the aforementioned clutch comprises a collar 14 supported upon the sleeve 10 and carrying a pin 15 movable in the slot of the sleeve, and a collar 16 slidable on the shaft 9 but keyed for conjunctive rotation with the same, and having at one side radial teeth 17 for engagement with corresponding teeth in the end of the section 8 of the shaft 5.

A fork 18 fitted in a circumferential groove of the collar has an arm 19 to which is attached a short shaft 20 which slides in an opening of the housing 21 of the transmission mechanism. The gear shift lever 22 of the vehicle to which the mechanism is applied, is fulcrumed at a side of the housing, as at 23, and it has at one side of its fulcrum a segmental arm 24 provided with a cam face 25, best shown in Figures 6 and 10, which rides in a groove of the short shaft 20, as shown in Figure 7. A spring-pressed detent 26 on the control lever 22 engages in a series of apertures in a stationary segment 27 to hold the lever in its several predetermined positions. When the detent is in the aperture 28 of the segment, the cam 25 engages in the groove of the shaft 20, which, in consequence, is moved lengthwise in the opening of the housing in which it is supported. The movement of the shaft causes the clutch-collar 16 to engage with the teeth of the section 8 of the hollow shaft 5, with the result that the shaft 5 and the shaft 9 are connected for conjunctive rotation. The rotary movement of the engine shaft is thus directly communicated to the shaft of the differential through the medium of the hollow shaft 5, and the vehicle runs at the speed commonly known as "high."

In the following description, the shaft 5 will be referred to as the driving shaft of the transmission mechanism and the shaft 9 as the driven shaft of the same.

The driving shaft 5 has at one end an eccentric head 29, which imparts an eccentric rotary movement to a gear-wheel 30. The rectangular hub 31 of this gear-wheel is slidably fitted in a carrier-frame 32, which in turn is slidably fitted in a slideway 33 of a hollow drum 34 hereinafter to be more fully described. The eccentrically moving gear wheel 30 meshes with the teeth of an internal gear-wheel 35 which is fixed on the driven shaft 9 by means of a key 36, and the parts thus arranged provide a universal movement-transmitting element permitting of the eccentric movement of the gear wheel 30 inside the internal gear wheel 35.

This element, as described, is similar to that of the Letters Patent hereinbefore referred to.

The drum 34 is loosely mounted on the shaft 5 and is one of a series of drums, together with drums 37, 38 and 39, likewise supported on the shaft in adjoining relation to each other.

Ball bearings 40 between adjoining faces of the drums reduce friction during their relative rotary movement.

The drum 34 has a cover plate 41 to enclose the coupling element hereinbefore described.

Each of the drums, 37, 38 and 39, has an internal gear, and the shaft 5 carries opposite to the said internal gears, pinions 42, 43 and 44.

The several pinions function to impart a rotary movement to the respective drums through the medium of planetary gears 45, 46 and 47, which are mounted for rotation upon stud shafts 48, 49 and 50 on the drums immediately adjoining those whose internal gears are engaged by the planetary gear wheels.

The gear wheels 45, 46 and 47 on the drums engage the internal gears immediately forward thereof, with reference to the position of the transmission between the engine at the front of the vehicle and the differential at the rear end of the same, but the gear wheel on the drum 39 engages the internal gear of the drum 38 immediately following the same in the same relation.

The transmission mechanism is designed to transmit the rotary movement of the engine shaft to the shaft of the differential at three different forward speeds, in addition to the "high" forward speed hereinbefore described, thru the medium of the drums 34, 37 and 38, and in a reverse direction thru the medium of the drum 39.

The three forward speeds are "low" corresponding with the drum 34, "first intermediate" by the drum 37, and "second intermediate" or "overspeed" by means of the drum 38.

The several drums of the transmission are held against rotation by clutch bands 51, 52, 53 and 54 fixed at one end on the housing 21 by means of screw-bolts 55, and connected at their other ends with eccentrically disposed wrists 56, 57, 58 and 59 on a crank-shaft 60, which is supported for rotation in bearings 61 and 62 on the housing. The four wrists are set progressively at right angles to each other, so that rotation of the crank-shaft thru one or more successive angles of ninety degrees each, will tighten any selected band upon the respective drum to hold the latter against rotation.

The crank-shaft 60 is rotated by means of the before-mentioned shift-lever 22, thru the medium of a toothed segment 63 and a pinion 64, and the holes of the segment 27, which are engaged by the dog 26 on the lever 22 to hold the lever in adjusted positions, correspond with the drums as follows: The hole 65 corresponds with the reversing drum 39; the hole engaged by the detent in Figure 6, with the "low" drum 34; the hole 66 with the "intermediate" drum 37; and the hole 67 with the "overspeed" drum 38.

In order to take the strain off the several clutch bands, when they are tightened upon the respective drums, the latter are provided with peripheral notches 68, for engagement with spring-pressed dogs 69 pivoted upon a shaft 70 on the housing. When the dogs engage in the notches of the respective drums, the latter are locked against rotation independent of the bands, and the latter are thereby relieved of continued stress.

In order to prevent the dogs from accidentally engaging with the respective drums, latches 71 hold the dogs normally in a retracted position against the pressure of their respective springs, and suitable mechanism, such as spring-supported push-rods 72, are provided to disengage the latches from the dogs at the will of the operator. It will be understood, without further illustration, that the same result may be obtained automatically by suitable connections between the latches and the shift-lever 22.

In the operation of the transmission mechanism, as hereinabove described, the rotary movement of the engine shaft is transmitted to the shaft of the differential at equal speed, and the vehicle runs "in high," when the detent of the lever 22 engages the hole 28 of the segment 27, and the teeth of the clutch collar 16 engage those at the end of the section 8 of the driving shaft 5, whereby the shafts 5 and 9 are connected for conjunctive rotation. The drums under this condition rotate in a body with the shaft 5. In all other positions of the shift lever, the clutch collar is disengaged from the teeth of the shaft 5, so that the latter may rotate around the driven shaft.

To operate the vehicle at "low" speed, the lever 22 is moved to the position shown in Figure 6, by which the wrist of the crank shaft is turned to tighten the band 51 upon the drum 34, which consequently is held against rotation. The eccentric movement imparted to the gear wheel 30 by rotation of the driving shaft 5, causes it to move in the circle of the internal gear wheel 35, with the result that the latter is rotated at a reduced velocity according to the ratio between the number of teeth in the internal gear and those of the gear wheel 30, which in the example given in the drawings is six to one. The rotary movement of the internal gear-wheel is transmitted to the driven shaft 9 thru the medium of the spline 36 and the differential is thereby operated at its lowest speed.

The rotary movement of the pinions 42, 43 and 44 on the shaft 5, will cause the planetary gear wheels to rotate in opposite directions, but since the drum 34 is held against rotation, the rotary movement of the gears is not communicated to drums 37, 38 and 39 which consequently will move idly about their common axis of rotation. To run the vehicle at second or intermediate speed, the lever 22 is moved to the position in which the detent 26 engages in the hole 66 of the segment 27. The crank shaft is thereby rotated thru its second quarter and the band 52 is tightened upon the drum 37 to hold the latter against rotation.

The rotary movement of the drive shaft causes thru the medium of its pinion 42, a rotary motion of the gear wheels 45 mounted on the drum 34 and since the drum 37 is stationary, said motion of the gear wheels 45, in engagement with the internal teeth of the drum 37, will result in a rotary movement of the drum 34, which movement is thru the medium of the slideway 33, the carrier frame 32, the gear wheel 30 and the internal gear wheel 35, transmitted to the driven shaft 9.

The ratio between the diameters of the gear wheels 45 and the internal gear of the drum 37, determines the rotary velocity of the drum 34 and of the gear wheel 30, and this velocity added to that imparted to the shaft 9 thru the medium of the eccentric, as hereinbefore explained, causes the said shaft to rotate at an increased velocity.

In the same manner, the velocity of the driven shaft may be still further increased by holding the drum 38 against rotation, which is accomplished by moving the lever 22 to the position in which its detent engages in the hole 67 of the segment 27. The crank-shaft is by movement of the lever 22, moved thru another arc of ninety degrees and the band 53 is thereby tightened upon the drum 38.

The movement of the gear wheels 46 in the circle of the internal teeth of the stationary drum, now causes rotation of the drum 37 on which the gear wheels 46 are mounted and the rotary movement of the drum 37 is thru the medium of the gear wheels 45, imparted to the drum 34. The velocity of the latter is equal to the combined velocities of the drums 37 and 38 and this velocity added to that constantly imparted to the driven shaft 9 by the eccentric 29, causes the shaft 9 to rotate at a third, still further increased velocity.

The highest velocity of the driven shaft is attained as stated hereinbefore, when all the drums are loose on the shaft and the driving shaft and the driven shaft are directly connected thru the medium of the clutch.

In order to rotate the shaft 9 in an opposite direction whereby to reverse the movement of the vehicle, the lever 22 is moved to bring the detent 26 into engagement with the hole 65 of the segment 27. The consequent rotation of the crank-shaft 60, causes the band 54 to be tightened upon the respective drum 39 which is thereby held stationary. The movement of the gear wheels 47 mounted on the stationary drum, causes rotation of the drums 38, 37 and 34 in the opposite direction, and the movement of the drum 34 is again communicated to the driven shaft 9 thru the medium of the gear wheels 30 and 35, it being understood that while the shaft 5 rotates in the other direction, the gear wheel 30 will move about the eccentric 29 as upon a bearing.

It will be apparent that the number of drums included in the invention may be increased or decreased according to any desired speed control within practical limits. As shown in Figure 11 of the drawings, the second drum 37 may be eliminated, in which case the gear wheels 53 of the third drum 38 are mounted upon the first drum 34.

What I claim and desire to secure by Letters Patent is:

1. Variable speed transmission comprising a driving shaft, a driven shaft, an internal gear wheel on the driven shaft, an external gear wheel mounted to move eccentrical in the circle of the teeth of the internal gear wheel by rotation of the driving shaft, a rotary drum, movement transmitting means for conjoint rotation of the external gear wheel and the drum, a second rotary drum having an internal gear, a pinion on the driving shaft, a planetary gear wheel carried by the first-mentioned drum and meshing with the pinion and the internal gear of the second drum, dogs movable into and out of engagement with said drums, clutch bands extending around the drums, means normally holding the dogs from engagement with their drums and the clutch bands loose on the drums, said means being movable to selectively tighten said clutch bands and release the dog corresponding to the tightened band.

2. Variable speed transmission comprising a driving shaft, a driven shaft, an internal gear wheel on the driven shaft, an external gear wheel mounted to move eccentrical in the circle of the teeth of the internal gear wheel by rotation of the driving shaft, a rotary drum, movement transmitting means for conjoint rotation of the external gear wheel and the drum, a second rotary drum having an internal gear, a pinion on the driving shaft, a planetary gear wheel carried by the first-mentioned drum and meshing with the pinion and the internal gear of the second drum, controlling means to hold either drum against rotation, and locking means to secure the drums against rotation, separate from said holding means.

3. Variable speed transmission comprising a driving shaft, a driven shaft, an internal gear wheel on the driven shaft, an external gear wheel mounted to move eccentrical in the circle of the teeth of the internal gear wheel by rotation of the driving shaft, a rotary drum, movement transmitting means for conjoint rotation of the external gear wheel and the drum, a second rotary drum having an internal gear, a pinion on the driving shaft, a planetary gear wheel carried by the first-mentioned drum and meshing with the pinion and the internal gear of the second drum, clutch bands to hold the drums against rotation, controlling means for the selective operation of the bands, and dogs movable into and out of locking engagement with the drums, said operating means normally holding said dogs disengaged from their drums and permitting selective engagement of the dogs and drums in correspondence with the operation of the clutch bands.

4. Variable speed transmission comprising a driving shaft, a driven shaft, means for transmitting rotary movement of the driving shaft to the driven shaft at a reduced velocity, inclusive of a rotary drum, a second rotary drum, gearing transmitting movement of the drive shaft to the first-mentioned drum when the second drum is in a non-rotative condition, friction means for selectively restraining rotation of said drums, other means normally out of engagement with the drums selectively holding said drums from rotation, and controlling means normally holding the last means from the drums and movable to apply the friction means and to release said other means for the respective drums.

5. Variable speed transmission comprising a driving shaft, a driven shaft, means for transmitting rotary movement of the driving shaft to the driven shaft at a reduced velocity, inclusive of a rotary drum, a second rotary drum, gearing transmitting movement of the drive shaft to the first-mentioned drum when the second drum is in a non-rotative condition, a clutch for connection of the shafts to transmit movement of the driving shaft directly to the driven shaft, friction means to hold drums selectively against rotation, other positive means to hold said drums selectively against rotation, and controlling means to selectively operate the clutch and both the holding means.

6. Variable speed transmission comprising a driving shaft, a driven shaft, means for transmitting rotary movement of the driving shaft to the driven shaft at a reduced velocity, inclusive of a rotary drum, a second rotary drum, gearing transmitting movement of the drive shaft to the first-mentioned drum when the second drum is in a non-rotative condition, a third rotary drum, gearing transmitting movement of the drive shaft to the second drum when the third drum is in a non-rotative condition, friction controlling means to hold any one drum against rotation other positive controlling means to selectively hold said drums against rotation, and means for simultaneously actuating the friction and positive means for restraining the drums selectively from rotation.

7. Variable speed transmission comprising a driving shaft, a driven shaft, means for transmitting rotary movement of the driving shaft to the driven shaft at a reduced velocity, inclusive of a rotary drum, a second rotary drum, controlling means to hold either drum against rotation, gearing transmitting movement of the drive shaft to the first-mentioned drum through intermediary of the second drum in a non-rotative condition, and locking means to secure the drums against rotation, separate from the controlling means.

8. Variable speed transmission comprising a driving shaft, a driven shaft, means for transmitting rotary movement of the driving shaft to the driven shaft at a reduced velocity, inclusive of a rotary drum, a second rotary drum, clutch bands to hold the drums against rotation, dogs for holding the drums selectively against rotation, latches for holding said dogs from engagement with the drums, means to release said latches, controlling means for the selective operation of the bands, and gearing transmitting movement of the drive shaft to the first-mentioned drum through intermediary of the second drum in a non-rotative condition.

9. Variable speed transmission comprising a driving shaft, a driven shaft, means for transmitting rotary movement of the driving shaft to the driven shaft at a reduced velocity, inclusive of a rotary drum, a second rotary drum having internal gears, a pinion on the drive shaft, a planetary gear carried by the first-mentioned drum and meshing with the pinion and with an internal gear of the second drum, a third rotary drum, a second pinion on the drive shaft, a planetary gear carried by the third drum, and meshing with said second pinion and with an internal gear of the first drum, a clutch for connection of the shafts to transmit movement of the driving shaft directly to the driven shaft, clutch bands to hold said drums selectively against rotation, dogs positively holding said drums selectively against rotation, and controlling means to selectively operate the clutch and both the holding means.

10. Variable speed transmission comprising a driving shaft, a driven shaft, means for transmitting rotary movement of the driving shaft to the driven shaft at a reduced velocity, inclusive of a rotary drum, a second rotary drum having an internal gear, a pinion on the drive shaft, a planetary gear carried by the first-mentioned drum and meshing with the pinion and with the internal gear of the second drum, a third rotary drum having internal gears, a fourth rotary drum, second and third pinions on the driving shaft, a planetary gear carried by the second drum and meshing with an internal gear of the third drum and with the second pinion, a planetary gear carried by the fourth drum and meshing with the third pinion and with an internal gear of the third drum, a clutch for connection of the shafts to transmit movement of the driving shaft directly to the driven shaft, clutch bands to hold said drums selectively against rotation, dogs positively holding said drums selectively against rotation, and controlling means to selectively operate the clutch and both the holding means.

11. Variable speed transmission comprising a hollow driving shaft, a rotary driven shaft inside the driving shaft, a clutch for direct connection of the shafts, an internal gear wheel on the driven shaft, an external gear wheel mounted to move eccentrically in the circle of the teeth of the internal gear wheel by rotation of the driving shaft, a rotary drum, movement transmitting means for conjoint rotation of the external gear wheel and the drum, a second rotary drum, gearing to transmit movement of the drive shaft to the first drum through the intermediary of the second drum in a condition of rest, clutch bands to hold the drums selectively against rotation, dogs positively holding the drums selectively against rotation, and controlling means for the dogs and the clutch bands and for the clutch.

12. Variable speed transmission comprising a driving shaft, a driven shaft, means for transmitting rotary movement of the driving shaft to the driven shaft at a reduced velocity, inclusive of a rotary drum, a plurality of additional rotary drums, planetary gearings operatively connecting said additional drums separately with the driving shaft, a member of the planetary gearing of each additional drum being carried by a next adjoining drum, clutch bands to hold the drums separately against rotation, dogs for positively holding said drums selectively against rotation, and controlling means for the selective operation of both said holding means simultaneously.

13. In a transmission, a hollow driving shaft, a driven shaft extending into the driving shaft, a sleeve on said driving shaft spaced from the driven shaft, an outer sleeve keyed to the adjacent ends of the driving shaft and first mentioned sleeve, said outer sleeve having a longitudinal slot therein, a clutch collar slidable on the driving shaft between the first mentioned sleeve and the driven shaft, said clutch collar being movable into and out of clutching engagement with the driven shaft, an operating collar slidable on the outer sleeve, and a pin extending through the slot in the outer sleeve and connecting said collars.

FRANCIS L. ORR.